US011761422B2

(12) United States Patent
Preston

(10) Patent No.: US 11,761,422 B2
(45) Date of Patent: Sep. 19, 2023

(54) RELATING TO WIND TURBINE BLADE MANUFACTURE

(71) Applicant: Vestas Wind Systems A/S, Aarhus N. (DK)

(72) Inventor: Robert Charles Preston, Cowes (GB)

(73) Assignee: Vestas Wind Systems A/S, Aarhus N (DK)

( * ) Notice: Subject to any disclaimer, the term of this patent is extended or adjusted under 35 U.S.C. 154(b) by 355 days.

(21) Appl. No.: 17/298,771

(22) PCT Filed: Dec. 9, 2019

(86) PCT No.: PCT/DK2019/050380
§ 371 (c)(1),
(2) Date: Jun. 1, 2021

(87) PCT Pub. No.: WO2020/119870
PCT Pub. Date: Jun. 18, 2020

(65) Prior Publication Data
US 2022/0034293 A1    Feb. 3, 2022

(30) Foreign Application Priority Data
Dec. 10, 2018    (DK) .......................... PA 2018 70802

(51) Int. Cl.
*F03D 1/06*    (2006.01)
*B29C 70/48*    (2006.01)
(Continued)

(52) U.S. Cl.
CPC .......... *F03D 1/0675* (2013.01); *B29C 70/302* (2021.05); *B29C 70/304* (2021.05);
(Continued)

(58) Field of Classification Search
CPC ................ F03D 1/0675; F05B 2230/60; F05B 2280/6003; F05B 2280/6013;
(Continued)

(56) References Cited

U.S. PATENT DOCUMENTS 10,502,180 B2 * 12/2019 Gorostidi Martinez de Lecea ..... F03D 1/0675
2012/0263600 A1 * 10/2012 Grove-Nielsen ....... B29C 70/48 416/223 R
(Continued)

FOREIGN PATENT DOCUMENTS

| CN | 1643249 A | 7/2005 |
|---|---|---|
| CN | 104061134 A | 9/2014 |

(Continued)

OTHER PUBLICATIONS

European Patent Office, Examination Report in EP19817955.8, dated Aug. 23, 2022.
(Continued)

*Primary Examiner* — Jorge L Leon, Jr.
(74) *Attorney, Agent, or Firm* — Wood Herron & Evans LLP

(57) ABSTRACT

A wind turbine blade shear web comprises an elongate panel (28) having a first side and an opposing second side and a longitudinally extending flange (30a, 30b) arranged along a longitudinal edge of the panel. The flange comprises a plurality of elongate flange sections (46) arranged along the first side of the panel and integrated therewith. Each flange section comprises a plurality of elongate flange elements arranged one on top of another and offset from one another in a longitudinal direction of the flange section (46) such that the offset between the flange elements defines a tapered portion at each of a first and second longitudinal end of the flange section. The tapered portions of longitudinally adja-
(Continued)

cent flange sections overlap to define at least one scarf joint between said adjacent flange sections.

10 Claims, 15 Drawing Sheets

(51) Int. Cl.
  *B29C 70/30* (2006.01)
  *B29L 31/08* (2006.01)
(52) U.S. Cl.
  CPC ......... *B29C 70/48* (2013.01); *B29L 2031/085* (2013.01); *F05B 2230/60* (2013.01); *F05B 2280/6003* (2013.01); *F05B 2280/6013* (2013.01); *F05B 2280/6015* (2013.01)
(58) Field of Classification Search
  CPC .......... F05B 2280/6015; B29C 70/302; B29C 70/304; B29C 70/48; B29L 2031/085
  USPC ....................................................... 416/230
  See application file for complete search history.

(56) References Cited

U.S. PATENT DOCUMENTS

| | | | | |
|---|---|---|---|---|
| 2013/0068389 | A1* | 3/2013 | Overgaard | B29C 70/34 156/324 |
| 2013/0091705 | A1 | 4/2013 | Kyriakides et al. | |
| 2013/0149154 | A1* | 6/2013 | Kuroiwa | B29C 70/304 416/146 R |
| 2014/0064980 | A1* | 3/2014 | Griesel | F03D 1/0675 156/305 |
| 2014/0271217 | A1* | 9/2014 | Baker | F03D 1/0683 416/226 |
| 2014/0301859 | A1* | 10/2014 | Hancock | F03D 1/0675 156/60 |
| 2015/0010406 | A1 | 1/2015 | Torgard | |
| 2015/0064014 | A1* | 3/2015 | Bakhuis | F03D 1/065 29/889.1 |
| 2015/0251370 | A1* | 9/2015 | Kirkeby | B29C 70/342 156/196 |
| 2015/0252780 | A1* | 9/2015 | Jonnalagadda | F03D 1/0675 416/226 |
| 2015/0308404 | A1* | 10/2015 | Dahl | B29D 99/0028 156/60 |
| 2015/0316028 | A1* | 11/2015 | Brekenfeld | F03D 1/0675 156/196 |
| 2016/0273516 | A1* | 9/2016 | Smith | B32B 3/30 |
| 2016/0279890 | A1* | 9/2016 | Jespersen | B29D 99/0028 |
| 2017/0021575 | A1* | 1/2017 | Hansen | B29C 70/342 |
| 2017/0058867 | A1* | 3/2017 | Yarbrough | F03D 1/0675 |
| 2017/0067439 | A1* | 3/2017 | Yarbrough | B29C 65/5021 |
| 2017/0074240 | A1* | 3/2017 | Caruso | B29C 66/112 |
| 2017/0211543 | A1* | 7/2017 | Sandercock | B29D 99/0025 |
| 2017/0320275 | A1* | 11/2017 | De Waal Malefijt | B29D 99/0003 |
| 2018/0216601 | A1 | 8/2018 | Yarbrough et al. | |
| 2018/0238301 | A1* | 8/2018 | Tobin | B29D 99/0028 |
| 2018/0283349 | A1* | 10/2018 | Wardropper | B29D 99/0003 |
| 2019/0178227 | A1* | 6/2019 | Hawkins | B29D 99/0028 |
| 2019/0293048 | A1* | 9/2019 | Roberts | B29C 65/1425 |
| 2020/0023557 | A1* | 1/2020 | Schibsbye | B29C 70/443 |
| 2020/0171768 | A1* | 6/2020 | Murray | B29C 66/1122 |
| 2020/0208605 | A1* | 7/2020 | Lund-Laverick | B32B 7/02 |
| 2020/0386203 | A1* | 12/2020 | Lund-Laverick | B29C 70/342 |
| 2021/0332790 | A1* | 10/2021 | Avaldi | F03D 1/06 |

FOREIGN PATENT DOCUMENTS

| | | | | |
|---|---|---|---|---|
| CN | 105619844 A | | 6/2016 | |
| CN | 105899803 A | | 8/2016 | |
| CN | 105934328 A | | 9/2016 | |
| CN | 107708982 A | | 2/2018 | |
| EP | 3424696 A1 | * | 1/2019 | |
| EP | 3482918 B1 | * | 12/2022 | ........... B29C 70/342 |
| GB | 2530072 A | * | 3/2016 | ............. B29B 11/16 |
| WO | 2014175798 A1 | | 10/2014 | |
| WO | 2016177375 A1 | | 11/2016 | |
| WO | WO-2018149526 A1 | * | 8/2018 | ........... F03D 1/0675 |
| WO | WO-2019048535 A1 | * | 3/2019 | ............. B64C 3/185 |

OTHER PUBLICATIONS

China National Intellectual Property Administration, First Notification of Office Action in CN Application No. 201980081984.1, dated Aug. 11, 2022.
Danish Patent and Trademark Office, Search and Exaination Report in PA 2018 70802, dated Jun. 27, 2019.
European Patent Office, Internatioanl Search Report and Written Opinion in PCT Application No. PCT/DK2019/050380, dated Feb. 21, 2020.

* cited by examiner

RELATING TO WIND TURBINE BLADE MANUFACTURE

TECHNICAL FIELD

The present invention relates generally to wind turbine blades and more specifically to a flange of a wind turbine blade shear web.

BACKGROUND

Modern wind turbine blades comprise an outer shell that defines the aerodynamic contour of the blade. One or more shear webs are typically arranged inside the outer shell. The shear webs are longitudinally-extending structures comprising a panel with upper and lower flanges extending along longitudinal edges of the panel. These flanges are used to bond the shear web to opposed load-bearing spar caps which may be integrated within the shell structure, or bonded to an inner surface of the shell.

An example of a known shear web flange is described in applicant's PCT application WO2016/177375A1. The flange is substantially T-shaped in cross-section and comprises an upstand extending transversely to a base. As described in this application, the use of pre-manufactured shear web flanges simplifies the manufacturing process of a shear web because it allows relatively simple shear web tooling and moulding processes to be used, and further avoids the need for subsequent bonding of return flanges.

The T-shaped flanges described in WO2016/177375A1 are formed using a pultrusion process, in which resin-coated fibres are pulled through a T-shaped pultrusion die. The pultrusion process necessarily requires a significant proportion of the fibres to extend parallel to the length of the flanges (i.e. in the 0° direction). However, the 0° fibres in these pultruded flanges may in some cases impart an undesirably high level of longitudinal stiffness to the flanges. If the longitudinal stiffness of the flanges is too high, a proportion of the bending loads may be carried by the flanges instead of by the spar caps. It is therefore desirable to reduce or avoid the use of longitudinally oriented 0° fibres in the shear web flanges.

A shear web flange may be divided into longitudinal flange sections to accommodate blade twist resulting from the variable geometry of a wind turbine blade along its length. Dividing the shear web flange into longitudinal flange sections also assists in the transportation of components before final assembly to complete the wind turbine blade. When manufacturing a shear web, the flange sections are arranged end to end. FIG. 1 shows first and second known shear web flange sections 500a, 500b with their longitudinal axes A-A aligned prior to being bonded together end-to-end to form part of a shear web flange. The flange sections 500a, 500b extend longitudinally and have a constant T-shaped cross-section along their length.

Opposed ends 502a, 502b of the known flange sections 500a, 500b have been chamfered transversely to their longitudinal axes A-A in order to form a sufficiently strong bond between adjacent flange sections 500a, 500b. The chamfered ends 502a, 502b define bonding surfaces 504a, 504b to which adhesive is applied before pressing the surfaces 504a, 504b together to form a bonded joint between the flange sections 500a, 500b. Chamfering the ends 502a, 502b of the flange sections 500a, 500b achieves a sufficiently strong joint between the sections 500a, 500b but also results in a considerable wastage of material, since large portions of the flange sections 500a, 500b must be discarded when making the chamfered cuts. This material wastage adds significant cost to the overall cost of materials for the blade.

Discontinuities along the shear web flange, for example where adjacent flange sections join, can result in stress concentrations when the blade undergoes loading in use. Accordingly, it is desirable to increase the bonding area to minimize stress concentrations at the joints between adjacent flange sections. However, in the case of the prior art, a compromise must be made between material wastage and a desirable bond area which may come at the cost of increased stress concentrations at the joint.

It is against this background that the present invention has been developed.

SUMMARY OF THE INVENTION

In a first aspect of the invention there is provided a wind turbine blade shear web. The shear web comprises an elongate panel having a first side and an opposing second side and a longitudinally extending flange arranged along a longitudinal edge of the panel. The flange comprises a plurality of elongate flange sections arranged along the first side of the panel and integrated therewith. Each flange section comprises a plurality of elongate flange elements arranged one on top of another and offset from one another in a longitudinal direction of the flange section such that the offset between the flange elements defines a tapered portion at each of a first and second longitudinal end of the flange section. The tapered portions of longitudinally adjacent flange sections overlap to define at least one scarf joint between said adjacent flange sections.

The plurality of flange elements may be substantially L-shaped in cross-section, each flange element comprising a base and an upstand, wherein the upstand extends substantially away from the base. The plurality of flange sections may be substantially L-shaped in cross-section such that each flange section comprises a base and an upstand, wherein the upstand extends substantially away from the base.

The shear web may comprise a plurality of flange sections arranged along the second side of the panel, wherein the upstands of the flange sections on the first side of the panel face towards the upstands of the flange sections on the second side of the panel, such that the longitudinally extending flange has a substantially T-shaped cross-section. In such a shear web, the longitudinal ends of the plurality of flange sections on the first side of the elongate panel may be longitudinally offset from the longitudinal ends of the plurality of flange sections on the second side of the elongate panel.

The tapered portions at the first and second ends of each flange section may be formed in the base of the flange section and may each define one of an upward or downward facing scarfed surface.

The upstand of each flange section may comprise a tapered portion at first and second longitudinal ends thereof, the tapered portions defining first and second scarfed surfaces of the upstand. The tapered portions of adjacent upstands may overlap to form at least one scarf joint between the upstands of longitudinally adjacent flange sections. For each flange section in a shear web flange, at least one flange element upstand may be integrated with the panel in a cured resin matrix.

A chordwise thickness of each flange section upstand may decrease with increasing distance from the flange section base. A thickness of each flange section base may decreases with increasing distance from the flange section upstand.

Longitudinal edges of each flange element may be offset from one another in a direction normal to the longitudinal direction of the flange section. The base of each flange section may define a mounting surface.

The flange elements may comprise a fibrous material such as +7-45 degree biaxial fabric, the fibrous material comprising less than 30% of fibres oriented in a longitudinal direction of the flange element; preferably the fibrous material comprises 0% of fibres oriented in a longitudinal direction of the flange element. Each flange section may be of laminate construction and may comprise a plurality of flange elements in a cured resin matrix.

In another aspect of the invention there is provided a wind turbine blade comprising the shear web as described above. In a further aspect of the invention there is provided a wind turbine comprising such a wind turbine blade.

In yet a further aspect of the present invention there is provided a method of manufacturing a wind turbine blade shear web. The method comprises arranging an elongate panel and arranging a plurality of flange sections along a longitudinal edge of the elongate panel. The flange sections each comprise a plurality of elongate flange elements arranged one on top of another and offset from one another in a longitudinal direction of the flange section so as to form tapered portions at respective first and second longitudinal ends of each flange section. The tapered portions of longitudinally adjacent flange sections overlap to define at least one scarf joint between said adjacent flange sections. The method further comprises integrating the plurality of flange sections and the elongate panel to form a wind turbine blade shear web.

The step of arranging the plurality of flange sections along a longitudinal edge of the elongate panel may further comprise arranging a plurality of flange elements on each of a first and second side of the elongate panel to form a flange having a substantially T-shaped cross section.

The flange elements may have a substantially L-shaped cross section, and the step of arranging the plurality of flange sections along a longitudinal edge of the elongate panel may further comprise arranging a plurality of flange elements back to back to form a flange section having a substantially T-shaped cross section. The method may further comprise arranging a layer of permeable material between adjacent flange sections when arranging the plurality of flange sections with the elongate panel.

In another aspect of the invention there is provided a method of forming a flange section of a shear web of a wind turbine blade. The method comprises providing a plurality of flange elements and arranging the plurality of flange elements in an array such that consecutive flange elements are positioned on top of one another. The method further comprises arranging consecutive flange elements in the array such that first and second longitudinal ends thereof are longitudinally offset from one another to form tapered portions at respective first and second longitudinal ends of the flange section, and bonding the plurality of flange elements together to form the flange section.

Adjacent flange elements in the array may be arranged with at least one longitudinal edge offset from a corresponding longitudinal edge of a neighbouring flange element to form a taper in a direction normal to the longitudinal direction of the flange section.

The method may further comprise arranging at least one additional flange element alongside the array of flange elements to form a substantially T-shaped flange section. The at least one additional flange element may be arranged such that a first end of the additional flange element is longitudinally offset from the tapered portion at the first end of the array, and a second end of the at least one additional flange element is longitudinally offset from the tapered portion at the second end of the array. Further, a plurality of additional flange elements may be arranged alongside the array of flange elements, and the plurality of additional flange elements may be arranged one on top of another and offset from one another to form tapered portions at first and second longitudinal ends of the flange section.

BRIEF DESCRIPTION OF THE DRAWINGS

A brief description of FIG. 1 has already been given above by way of background to the present invention. The present invention will now be described by way of non-limiting examples with reference to the following figures, in which.

DETAILED DESCRIPTION

Figure 1:
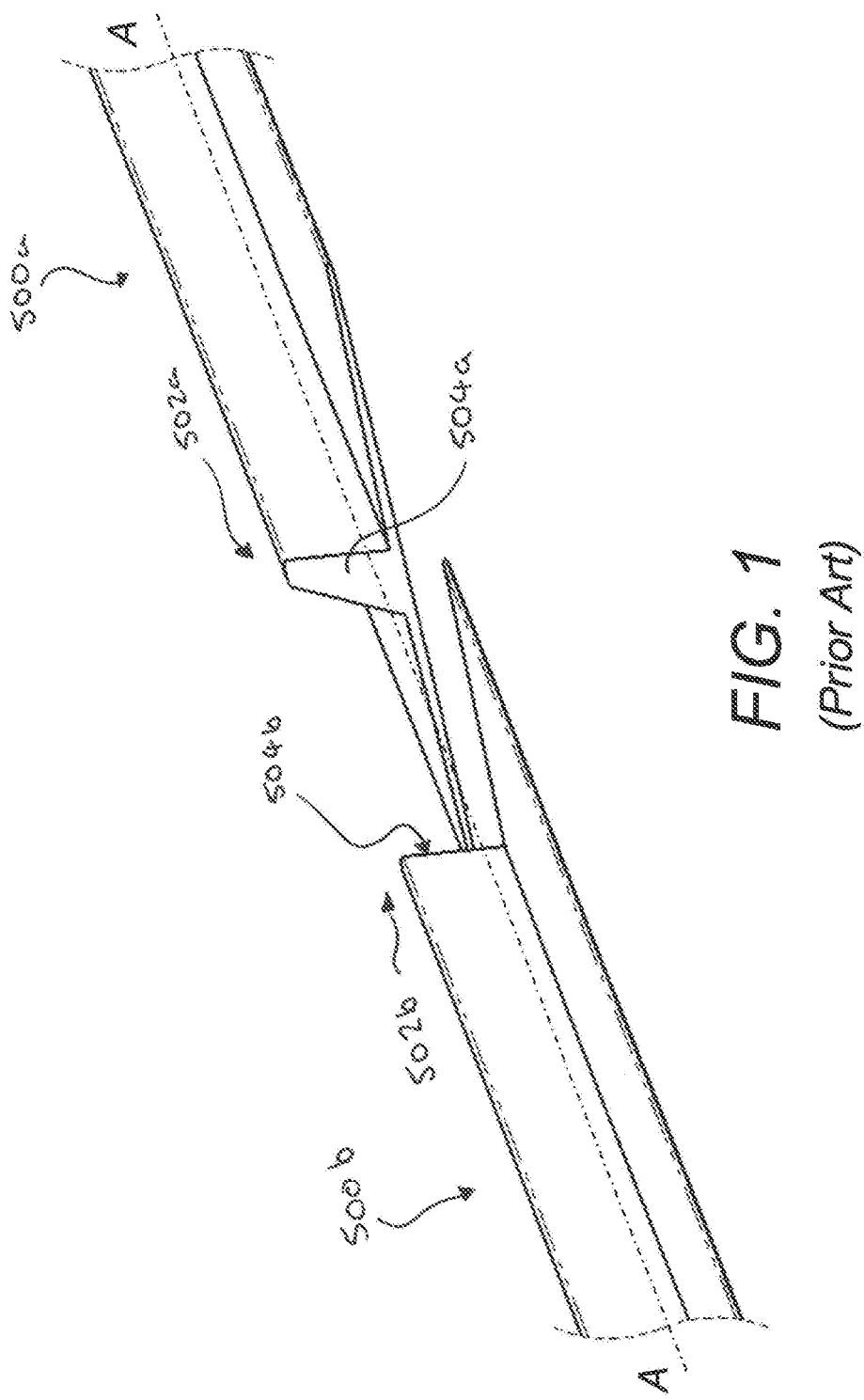
Figure 2:
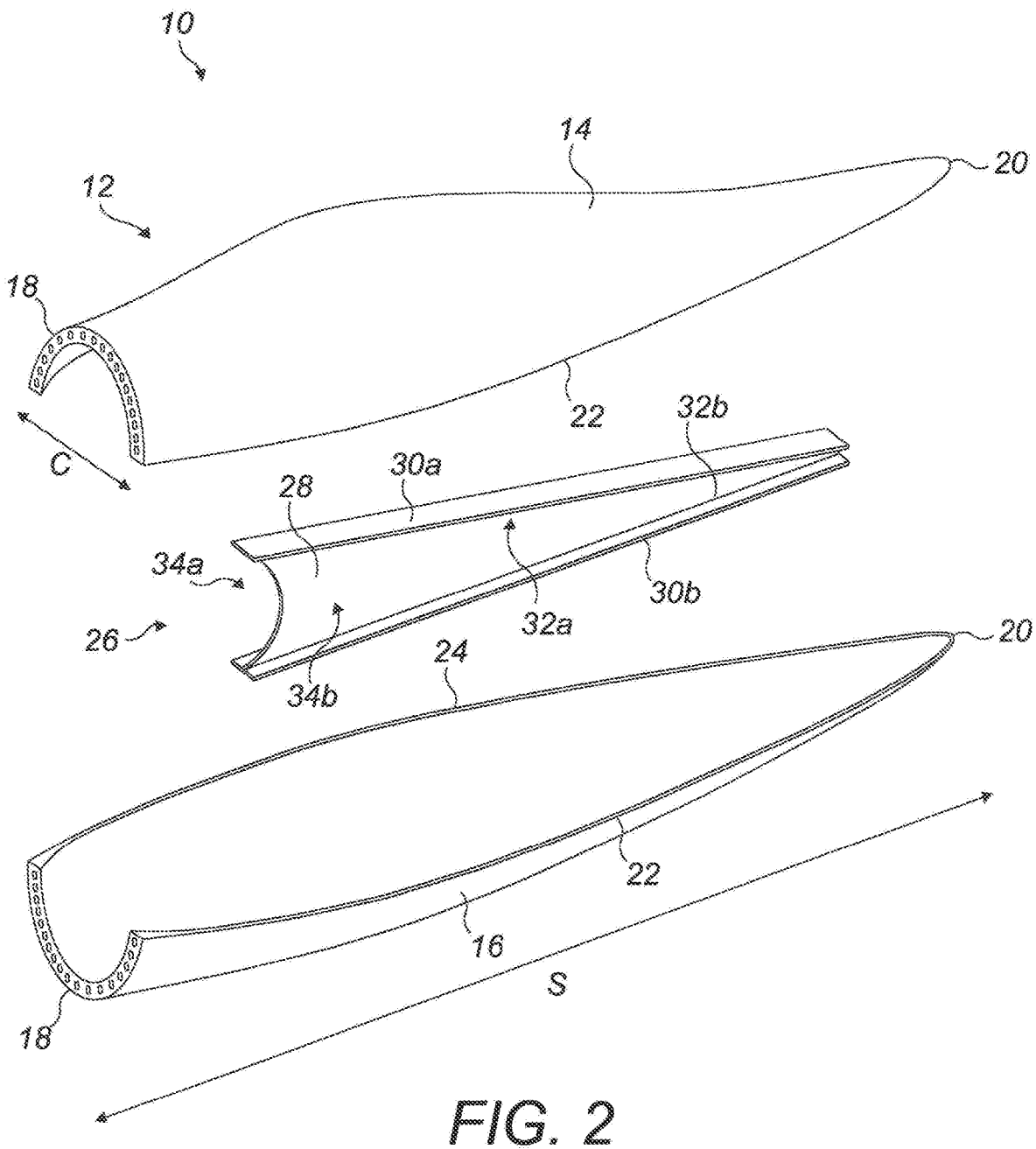
FIG. 2 is an exploded view of a wind turbine blade.

FIG. 2 is an exploded view of a wind turbine blade 10. The blade 10 comprises an outer shell 12 of a composite construction and formed in two parts: a leeward half shell 14 and a windward half shell 16. The blade 10 extends in a spanwise direction (S) between a root 18 and a tip 20, and in a chordwise direction (C) between a leading edge 22 and a trailing edge 24. A shear web 26 is located inside the blade 10. The shear web 26 comprises an elongate panel 28 and upper and lower flanges 30a, 30b extending transverse to the panel 28 and arranged along longitudinal edges 32a, 32b thereof. The elongate panel 28 is formed of a lightweight core material such as polyurethane foam, polystyrene or balsa wood. In this example, the shear web 26 has a substantially I-shaped cross-section wherein the flanges 30a, 30b extend transverse to the shear web panel 28 on both a first 34a and an opposing second 34b side of the shear web 26.

Each shear web flange 30a, 30b extends in the spanwise direction (S) and comprises longitudinal flange sections 36 (shown in FIG. 4) which are integrated with the panel 28 when forming the shear web 26. A flange section 36 according to an example of the invention is described in more detail below with reference to FIG. 4. It will be appreciated that the invention is not limited to shear webs 26 having an I-shaped cross section such as that shown in FIG. 2; in some examples, a shear web 226 may comprise flanges extending transverse to the shear web panel 28 on only one of the first or second sides 34a, 34b thereof as shown for example in FIG. 7.

Figure 3:
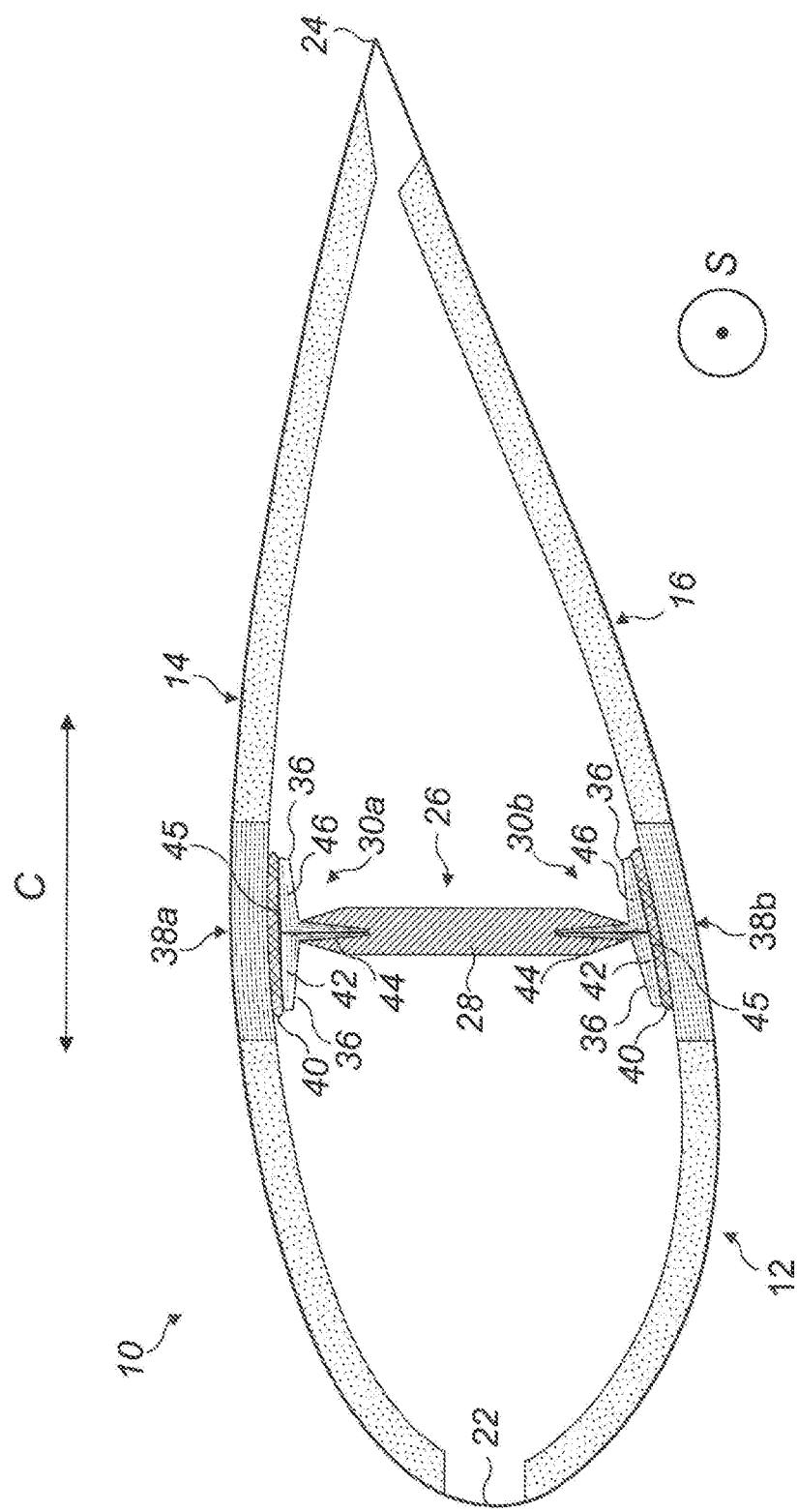
FIG. 3 is a schematic cross-sectional view of a wind turbine blade.

FIG. 3 shows a cross-sectional view of the wind turbine blade 10 according to a first example. The blade 10 includes first and second spar caps 38a, 38b integrated respectively in the leeward and windward half shells 14, 16 of the blade 10. The upper and lower flanges 30a, 30b of the shear web 26 are bonded respectively to the first and second spar caps 38a, 38b by means of adhesive 40.

In this example, the shear web flanges 30a, 30b are substantially T-shaped in cross-section. The T-shaped flanges 30a, 30b comprise a plurality of flange sections 36 each comprising a base 42 and an upstand 44 extending substantially away from the respective base 42 and having a substantially L-shaped cross-section. The upstand 44 of each flange section 36 is integrated with the shear web panel 28. The base 42 of each flange section 36 defines a mounting surface 45 which, by means of adhesive 40, is bonded to a spar cap 38a, 38b. The shear web 26, is therefore mounted between the opposed spar caps 38a, 38b via the mounting surface 45 defined by the base 42 of each flange section 36.

Each flange section 36 is formed of a plurality of flange elements 46 as will be described in more detail below. The flange sections 36 that form a shear web flange 30a, 30b may not necessarily all have the exact same profile. For example, it is possible to form flange sections 36 having a variety of profile shapes dependent on the prescribed location of a flange section 36 in the shear web flange 30, 30b. In the example shown in FIG. 3, the flange sections 36 comprise a base 42 and upstand 44 which are substantially perpendicular to one another. However, at other locations along the spanwise S length of the shear web 26, flange sections 36 having a different profile may be implemented to best fit the aerodynamic profile of the outer shell 12 of the blade 10.

Further to this, a chordwise C width of the flange 30a, 30b may vary along the spanwise S length of the shear web 26 to provide optimal site specific structural properties along the blade 10. The flange sections 36 can be tailored as a result of the properties of individual flange elements 46 such as width and material of an element 46 and in how the flange elements 46 are arranged with one another. Alternatively, each of the flange sections 36 may comprise a uniform width resulting in a shear web flange 30a, 30b having a uniform chordwise C width along its entire spanwise S length.

Figure 4:
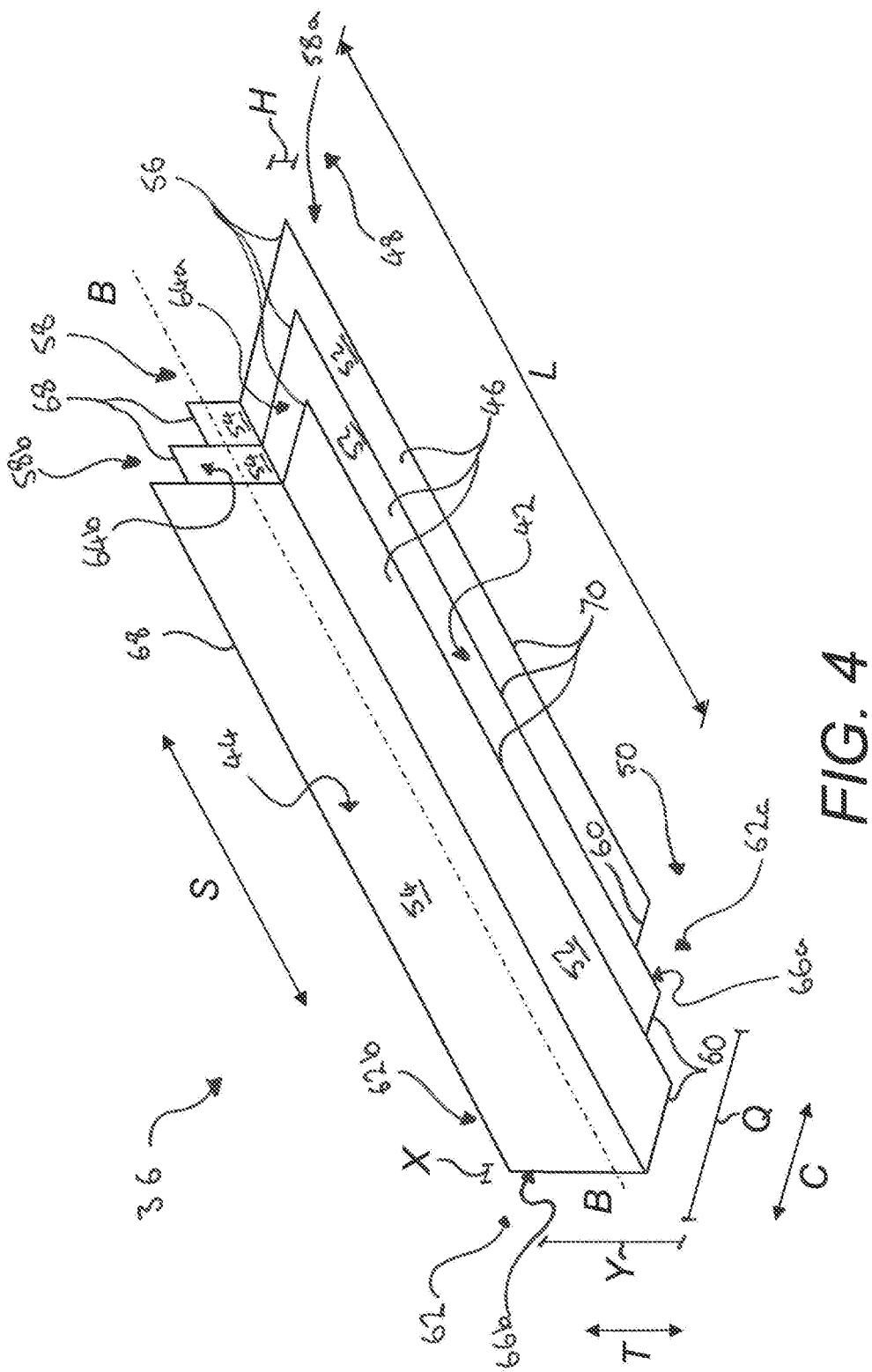
FIG. 4 is a schematic perspective view of a shear web flange section.

FIG. 4 is a schematic perspective view of a shear web flange section 36 according to the first example. In this example, the flange section 36 is a cured component of laminate construction, comprising a plurality of flange elements 46 in a cured resin matrix. It will however be appreciated that in some examples, as described below with reference to FIGS. 11a to 11g, the flange elements 46 may only be integrated with one another in the resin matrix at the same time that the flange section 36 is integrated with the elongate panel 28 when manufacturing the complete shear web 26.

The flange elements 46 comprise a fibrous material such as +/−45° biaxial fabric in which the fibres are oriented at +/−45° to the longitudinal direction (S) of the flange element 46. In an example, the fibres are glass fibres. In preferred examples, the fibrous material comprises less than 30% of fibres oriented in the longitudinal direction (S) of the flange element 46. Preferably the fibrous material comprises 0% of fibres oriented in the longitudinal direction (S) of the flange element 46.

The shear web flange 30 formed by a plurality of flange sections 36 shown in FIG. 4 may be an upper flange 30a or a lower flange 30b of the shear web 26 shown in FIGS. 2 and 3. The flange section 36 is elongate and extends in the spanwise direction (S) from a first end 48 to a second end 50. A longitudinal axis B-B of the flange section 36 is indicated in FIG. 4. The flange section 36 comprises a plurality of elongate flange elements 46 arranged one on top of another. The flange elements 46 are substantially L-shaped in cross-section, each flange element 46 comprising a base 52 and an upstand 54 which extends substantially away from the base 52. In the example illustrated in FIG. 4, the flange section 36 comprises three discrete flange elements 46 though it will be appreciated that any number of a plurality of flange elements 46 arranged as described may be applicable for a flange section 36 without departing from the scope of the invention.

The flange elements 46 are offset from one another in a longitudinal direction (S) of the flange section 36, i.e. a first longitudinal end 56 of each flange element 46 is longitudinally offset from a corresponding first longitudinal end 56 of a neighbouring flange element 46, defining a tapered portion 58 at the first longitudinal end 48 of the flange section 36. In the present example, the flange elements 46 are of equal length (L) and the longitudinal offset of the respective first ends 56 of the flange elements 46 therefore results in a similar longitudinal offset of a second longitudinal end 60 of each flange element 46 from that of a neighbouring flange element 46 defining a further tapered portion 62. A tapered portion 58, 62 is thereby formed at each of the first and second longitudinal ends 48, 50 of the flange section 36.

As shown in FIG. 4, tapered portions 58a, 62a at the first and second longitudinal ends 48, 50 are formed in the base 42 of the flange section 36. Each of the tapered portions 58a, 62a in the base 42 of the flange section 36 define one of an upward or downward facing scarfed surface 64a, 66a. The longitudinal offset between flange elements 46 of the flange section 36 similarly forms tapered portions 58b, 62b of the upstand 44 at first and second longitudinal ends 48, 50 thereof. The tapered portions 58b, 62b of the upstand 44 define first and second scarfed surfaces 64b, 66b of the upstand 44.

Flange sections at the root end 18 and tip end 20 of the flange 30 are formed differently from the flange sections 36 described herein. The tapered portions 58, 62 of a flange section 36 are configured to form a scarf joint between longitudinally adjacent flange sections 36 in a shear web flange 30. Therefore, in a tipmost or rootmost flange section having only one other longitudinally adjacent flange section 36, a tapered portion may only be formed at one of the first or second longitudinal ends 48, 50 of said tipmost or rootmost flange section.

Longitudinal edges 68 of each flange element 46 are offset from one another in a direction T normal to the longitudinal direction B of the flange section 36. As a result of the offset between corresponding longitudinal edges 68 of each flange element 46, the upstand 44 of the flange section 36 tapers; a chordwise C thickness X of the upstand 44 decreasing as a distance Y from the flange section base 42 increases. In this example, further longitudinal edges 70 of the flange elements 46 are similarly offset from one another such that a thickness H of the flange section base 42 decreases with increasing distance Q from the upstand 44. In other examples, a flange section 36 may comprise flange elements 46 each having different widths. In this case even with an offset between longitudinal edges 68 of each flange element 46 to form a tapered upstand 44, the further longitudinal edges 70 of each flange element 46 are aligned with one another resulting in a base 42 having a constant thickness H across the chordwise C width of the flange section 36.

Figure 5:
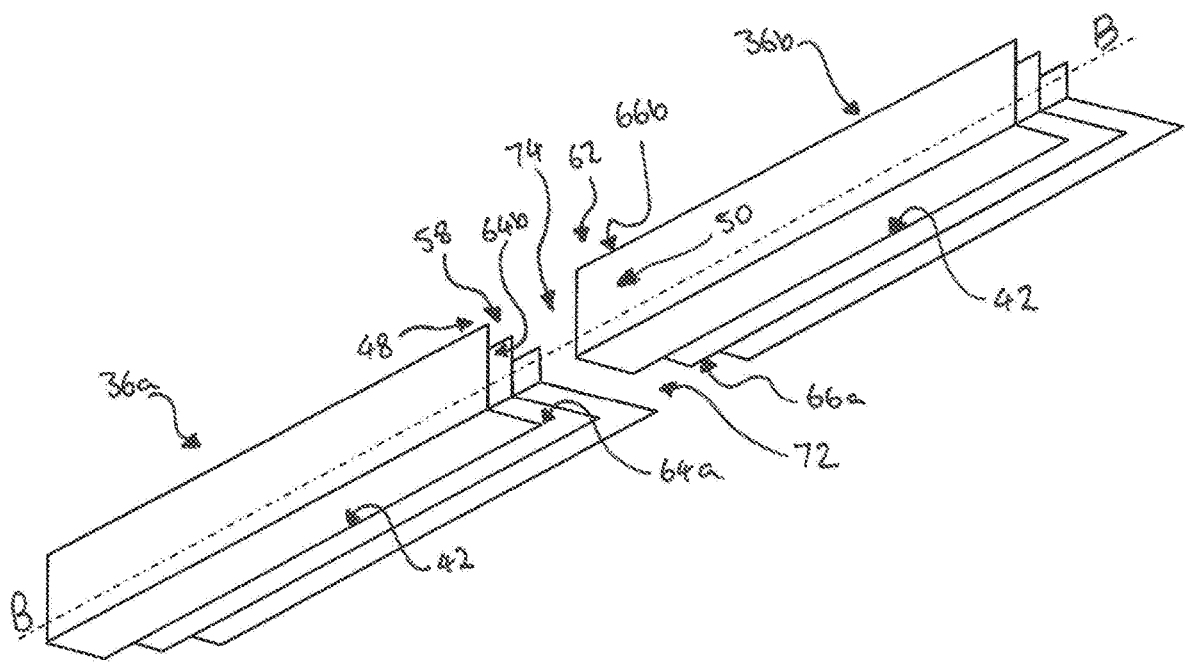
FIG. 5 is a schematic perspective view of an arrangement of first and second shear web flange sections.

FIG. 5 shows a schematic perspective view of a first and second flange section 36a, 36b arranged with their longitudinal axes B-B aligned. The scarfed surfaces 64a, 64b at the first end 48 of the first flange section 36a are configured to mate with the scarfed surfaces 66a, 66b at the second end 50 of the second flange section 36b. That is, the scarfed surface 64a defined in the base 42 at the first end 48 of the first flange section 36a and the scarfed surface 66a defined in the base 42 at the second end 50 of the second flange section 36b form a scarf joint 72 when assembled to form the shear web flange 30. Similarly, a scarf joint 74 is formed between the upstands 44 of longitudinally adjacent flange sections 36 where the tapered portions 58, 62 at the first end 48 of the first flange section 36a and second end 50 of the second flange section 36b overlap in an assembled shear web flange 30.

Figure 6:
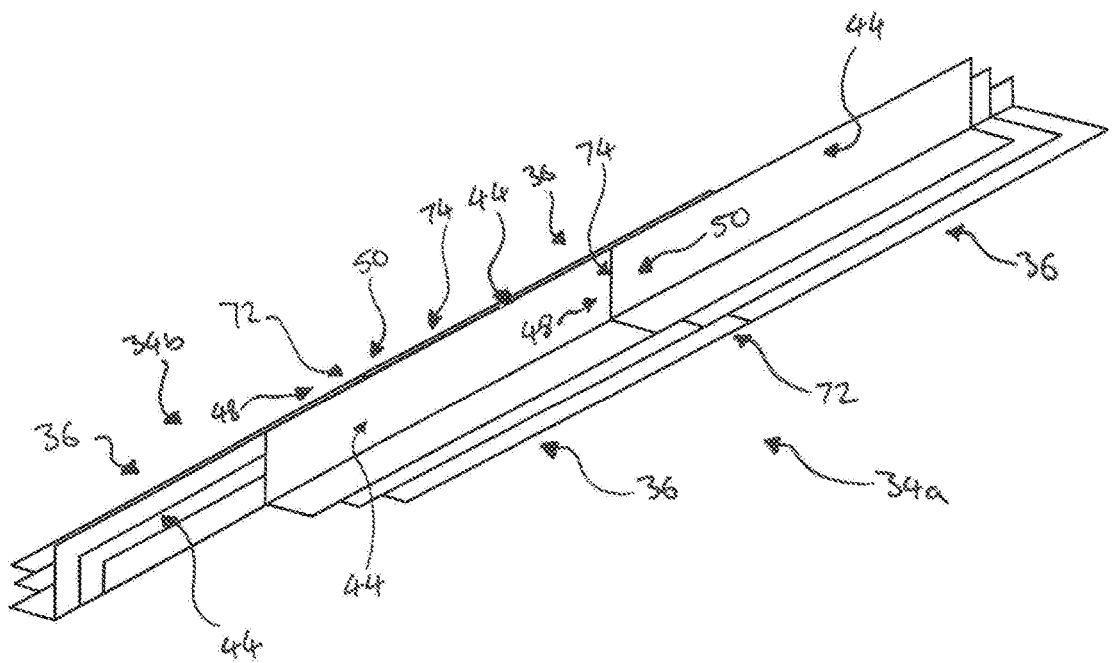
FIG. 6 is a schematic perspective view of four flange sections arranged to form part of a shear web flange.

FIG. 6 shows a schematic perspective view of four L-shaped flange sections 36 arranged to form part of a shear web flange 30 such as the flange 30a or 30b shown in FIGS. 2 and 3. The flange sections 36 are arranged such that a plurality of flange sections 36 are arranged along each of the first and second sides 34a, 34b of the shear web panel 28 as also shown in FIG. 3. The upstands 44 of the flange sections 36 on the first side 34a of the panel 28 face towards the upstands 44 of the flange sections 36 on the second side 34b of the panel 28. In other words, the upstands 44 of each of the flange sections 36 are directed in substantially the same direction, namely substantially parallel to the first and second sides 34a, 34b of the elongate shear web panel 28. The longitudinally extending flange 30 formed by the plurality of flange sections 36 therefore comprises a T-shaped cross-section.

Although each of the flange sections 36 in the example shown in FIG. 6 comprise substantially the same profile, i.e. with an upstand 44 and base 42 substantially perpendicular to one another, it is anticipated that in some examples flange sections 36 on the first side 34a of the shear web 26 may comprise a different profile to a flange section 36 on the second side 34b of the shear web 26. An example where this may occur is at the tip end 20 of the shear web 26, where the shell 12 of the wind turbine blade 10 tapers and twists to optimise aerodynamic and structural properties of the blade 10. At the tip end 20 of the shear web 26, flange sections 36 on the first side 34a of the shear web 26 may comprise a profile wherein an angle between the upstand 44 and base 42 is substantially less than 90°, and flange sections 36 on the second side 34b of the shear web 26 may comprise a profile wherein an angle between the upstand 44 and base 42 is substantially greater than 90°.

The flange sections 36 are arranged such that longitudinal ends 48, 50 of the plurality of flange sections 36 on the first side 34a of the elongate panel 28 are longitudinally offset from the longitudinal ends 48, 50 of the plurality of flange sections 36 on the second side 34b of the elongate panel 28. Accordingly, scarf joints 72, 74 formed between longitudinally adjacent flange sections 36 on the first side 34a of the shear web 26 are longitudinally offset (i.e. in a spanwise direction) from scarf joints 72, 74 formed between longitudinally adjacent flange sections 36 arranged on the second side 34b of the shear web 26. Advantageously, in a blade 10 comprising such an arrangement of flange sections 36 there is a continuous load path between the spar caps 38a, 38b, elongate panel 28 and shear web flanges 30a, 30b along the entire length of the shear web 26. Therefore, an improved joint solution between flange sections 36 of a shear web flange 30 which reduces or completely overcomes the stress concentrations at discontinuities between longitudinally adjacent flange sections 36 is provided.

Figure 7:
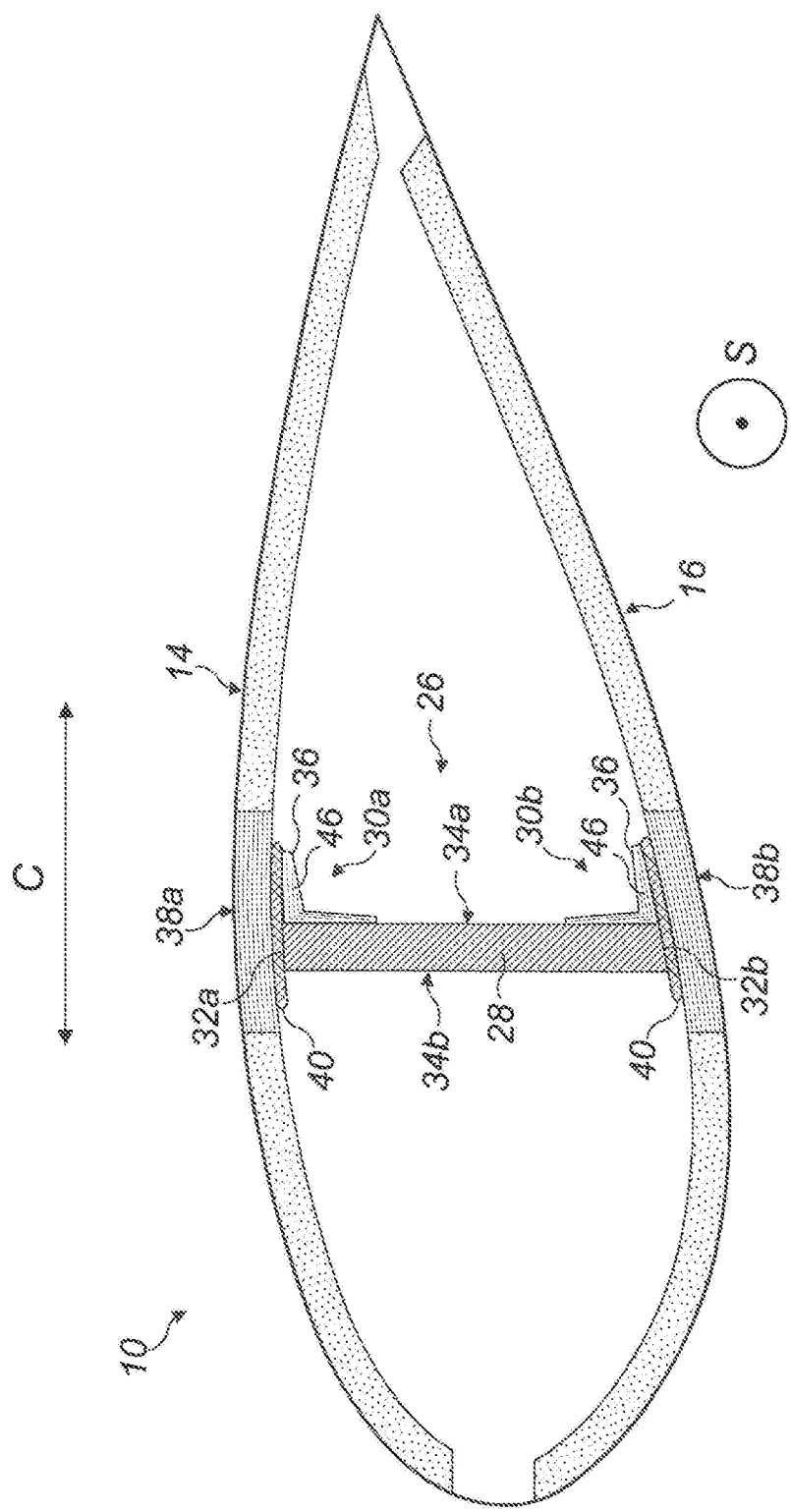
FIG. 7 is a schematic cross-sectional view of a wind turbine blade according to a second example.

FIG. 7 shows a cross-sectional view of a wind turbine blade 10 according to a second example. The wind turbine blade 10 comprises a shear web 26 bonded between mutually opposed spar caps 38a, 38b in each half shell 14, 16. The shear web 26 in this example comprises an elongate panel 28 having a first side 34a and an opposing second side 34b. As in the first example, a longitudinally extending flange 30a, 30b formed of a plurality of flange sections 36 is arranged along a longitudinal edge 32a, 32b of the panel 28. In the present example, the flange sections 36 are arranged along the first side 34a of the panel 28 and integrated therewith to form a C-shaped web 26 instead of the I-shaped shear web 26 of the first example.

In this second example, the flange sections 36 are formed according to the description of the first example above, from a plurality of L-shaped flange elements 46 arranged on top of one another and longitudinally offset from one another such that the offset between flange elements 46 defines a tapered portion at each of the first and second longitudinal ends of the flange section. Similarly, in this example the flange elements 46 comprise a fibrous material such as +/−45° biaxial fabric. A plurality of flange sections 36 are arranged along the first side 34a of the panel 28 with tapered portions overlapped to form scarf joints between longitudinally adjacent flange sections 36.

Figure 8:
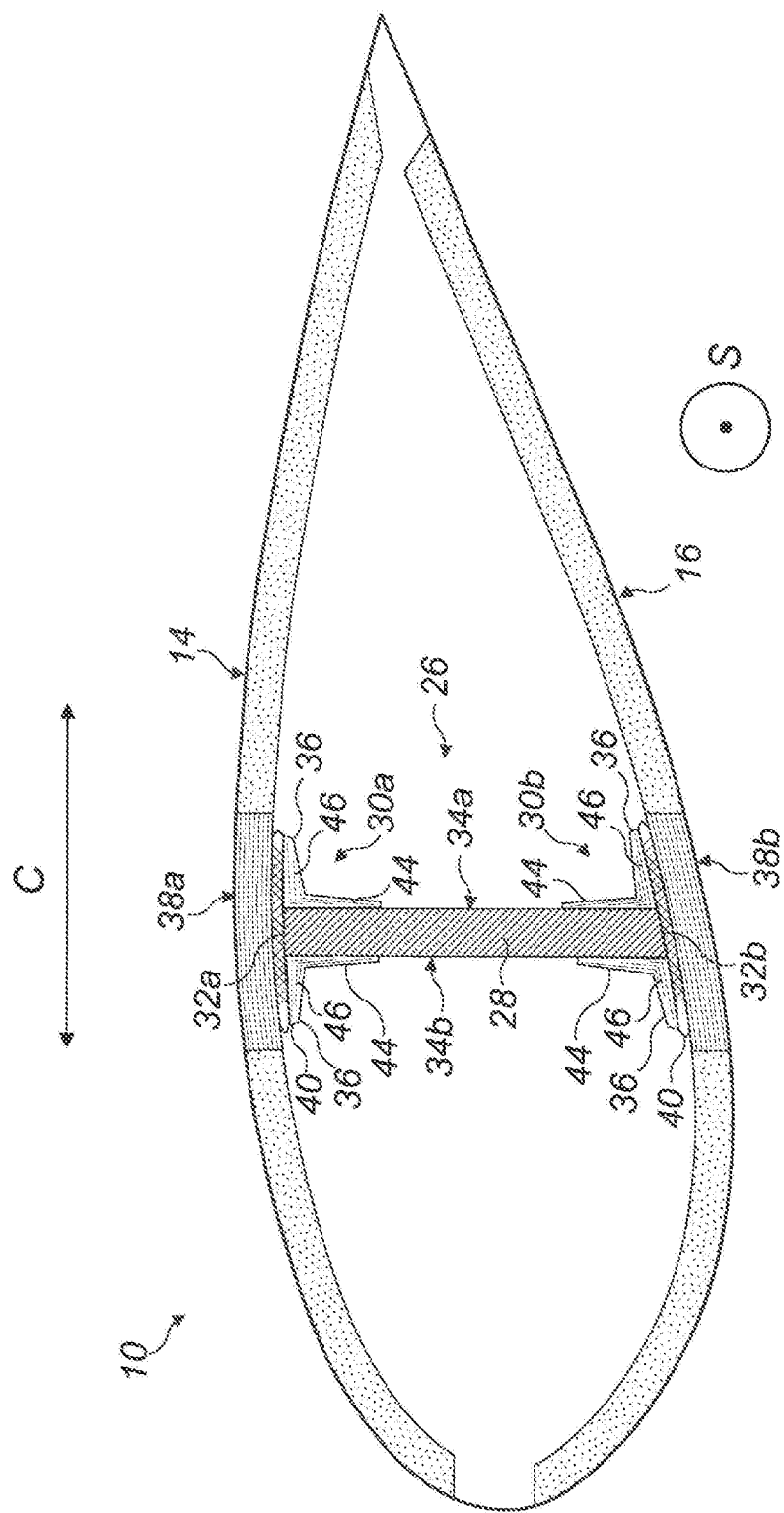
FIG. 8 is a schematic cross-sectional view of a wind turbine blade according to a development on the second example.

FIG. 8 shows a development on the second example described above. The wind turbine blade 10 of the second example may further comprise a plurality of flange sections 36 arranged along the second side 34b of the shear web panel 28. The upstands 44 of the flange sections 36 on the second side 34b of the elongate panel 28 face towards the upstands 44 of the flange sections 36 on the first side 34a of the elongate panel 28, i.e. the upstand 44 of each flange section 36 extends substantially parallel to the first or second side 34a, 34b of the elongate panel 28, such that the resulting shear web flange 30a, 30b has a substantially T-shaped cross-section. In this example, the elongate panel 28 is sandwiched between the upstands 44 of the flange sections 36. The flange sections 36 are arranged such that longitudinal ends of the plurality of flange sections 36 on the first side 34a of the elongate panel 28 are longitudinally offset from the longitudinal ends of the plurality of flange sections 36 on the second side 34b of the elongate panel 28.

Figure 9A:
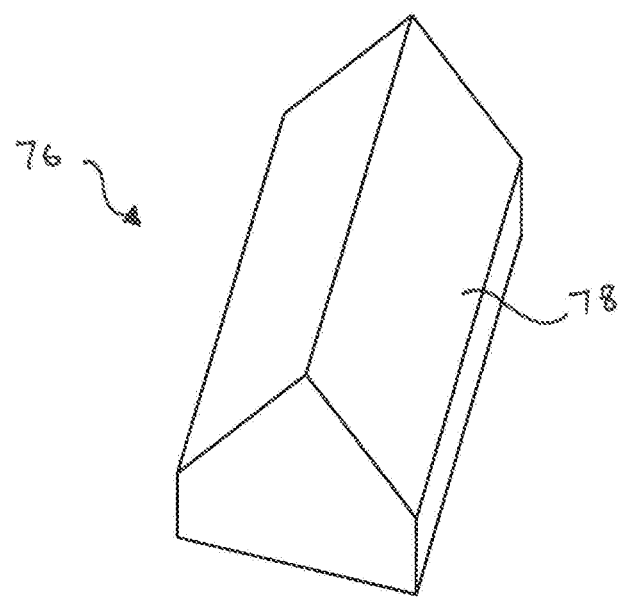
FIGS. 9a to 9c schematically show stages involved in manufacturing shear web flange sections.
Figure 9B:
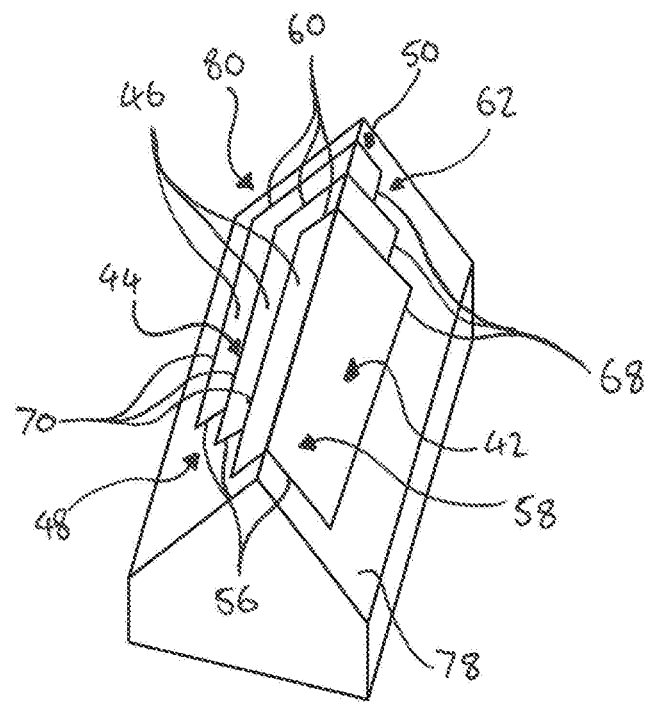
Figure 9C:
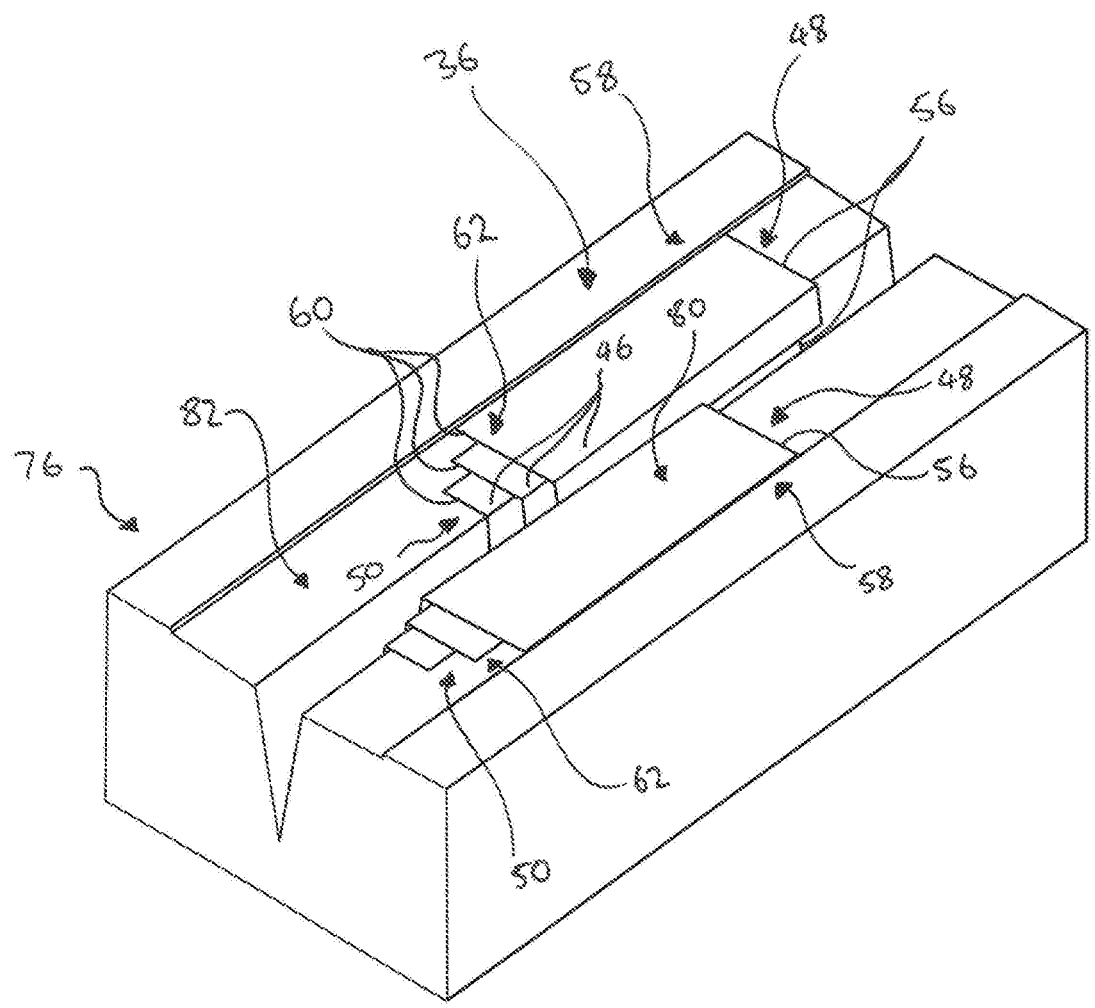

Methods of manufacturing flange sections 36 and shear webs 26 according to various examples will now be described with reference to FIGS. 9a to 11g. The shear web flange sections 36 may be pre-manufactured prior to forming the shear web 26 of the wind turbine blade 10 according to a method as shown in FIGS. 9a to 9c. An alternative example in which the flange sections 36 are pre-manufactured prior to forming the shear web 26 is described with reference to FIGS. 10a to 10d wherein the flange sections 36 are formed by a resin transfer moulding (RTM) process. Finally, in a yet a further example, the flange sections 36 formed of a plurality of flange elements 46 may be formed when the complete shear web 26 is formed in a single operation, as described below with reference to FIGS. 11a to 11g.

FIG. 9a shows a schematic view of a mould tool 76 which may be used to form a wind turbine blade shear web flange section 36. Although a male (convex) mould surface 78 is depicted in FIG. 9a, the method of manufacture is equally possible using a female (concave) mould surface 78 without departing from the scope of the invention. A plurality of flange elements 46 comprising a fibrous material such as +/−45° biaxial fabric are provided and arranged on the mould surface 78 as shown in FIG. 9*b*. The flange elements 46 can be formed using tapes of fibrous material which are provided in standard widths and cut into strips of a desired length. This results in zero material wastage in preparing the flange elements 46 for a flange section 36.

The flange elements 46 are arranged in an array 80 with consecutive flange elements 46 positioned one on top another. First and second longitudinal ends 56, 60 of each flange element 46 are longitudinally offset from corresponding first and second longitudinal ends 56, 60 of flange elements 46 in the array 80 to form tapered portions 58, 62 at the first and second ends 48, 50 of the flange section 36.

Adjacent flange elements 46 in the array 80 are arranged with at least one longitudinal edge 68 offset from a corresponding longitudinal edge 68 of a neighbouring flange element 46 to form a taper in a direction normal to the longitudinal direction of the flange section 46. In the present example, two longitudinal edges 68, 70 of each flange element 46 are offset from corresponding longitudinal edges 68, 70 of neighbouring flange elements 46 which results in the tapered upstand 44 and base 42 of the flange section 36 as described above with reference to FIG. 4.

Optionally, as shown in FIG. 9*c*, at least one further flange element 46 may be arranged alongside the array 80 of flange elements 46 on a mould surface 82 to form a flange section 36 having a substantially T-shaped cross-section. In a preferred example, a plurality of further flange elements 46 are arranged alongside the array 80 of flange elements 46. In this case, it may be advantageous to arrange the flange elements 46 on a mould surface 82 having a substantially T-shaped cross-section. The plurality of further flange elements 46 are arranged one on top of another with longitudinal ends 56, 60 of each flange element 46 longitudinally offset from one another to form tapered portions 58, 62 at first and second ends 48, 50 of the flange section 36. The plurality of further flange elements 46 are arranged such that the tapered portions 58, 62 formed by the further flange elements 46 at each of the first and second ends 48, 50 are longitudinally offset from the tapered portions 58, 62 formed at the first and second ends 48, 50 of the array 80 of flange elements 46.

The flange elements 46 are bonded together in a composite moulding process to form the flange section 36. Such a moulding process may be vacuum assisted resin transfer moulding (VARTM) or a pre-preg-process. The cured flange section 36 can then be removed from the mould 76 and stored or transported to a different assembly site.

The flange sections 36 described above may alternatively be formed by a resin transfer moulding (RTM) process as illustrated in FIGS. 10*a* to 10*d*.

Resin transfer moulding (RTM) means a closed mould process in which fibrous reinforcement material is placed in a matched mould. Resin is then injected under pressure into the mould cavity which flows through the fibres to fill the mould space. The matched mould is typically in two parts that are clamped or pressed together. RTM is distinguished from vacuum bag moulding, such as vacuum assisted resin transfer moulding (VARTM) where there is no matched mould, and instead a flexible sheet is placed over dry fibrous material to form a mould cavity and once the mould cavity is sealed vacuum is applied and resin is infused into the mould cavity.

Figure 10A:
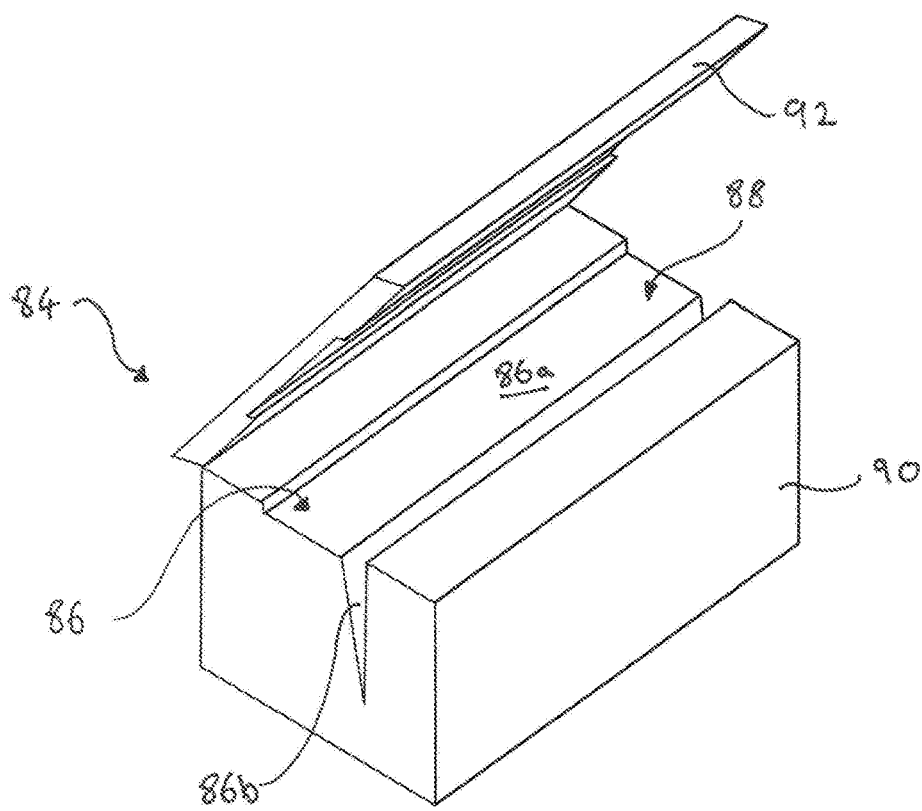
FIGS. 10a to 10d schematically show stages involved in manufacturing shear web flange sections by a resin transfer moulding process.

A mould assembly 84 comprising a mould surface 86 that defines a mould cavity 88 is provided as schematically shown in FIG. 10*a*. In this example the mould assembly 84 comprises a first and second mould part 90, 92, though it will be appreciated that other mould assembly configurations configured to form a flange section 36 are equally as applicable. The mould surface 86 comprises a first portion 86*a* that forms the base 42 of a flange section 36 and a second portion 86*b* extending substantially away from the first portion 86*a*. The second portion 86*b* of the mould surface 86 forms the upstand 44 of a flange section 36 which extends substantially away from the base 42 of said flange section 36.

Figure 10B:
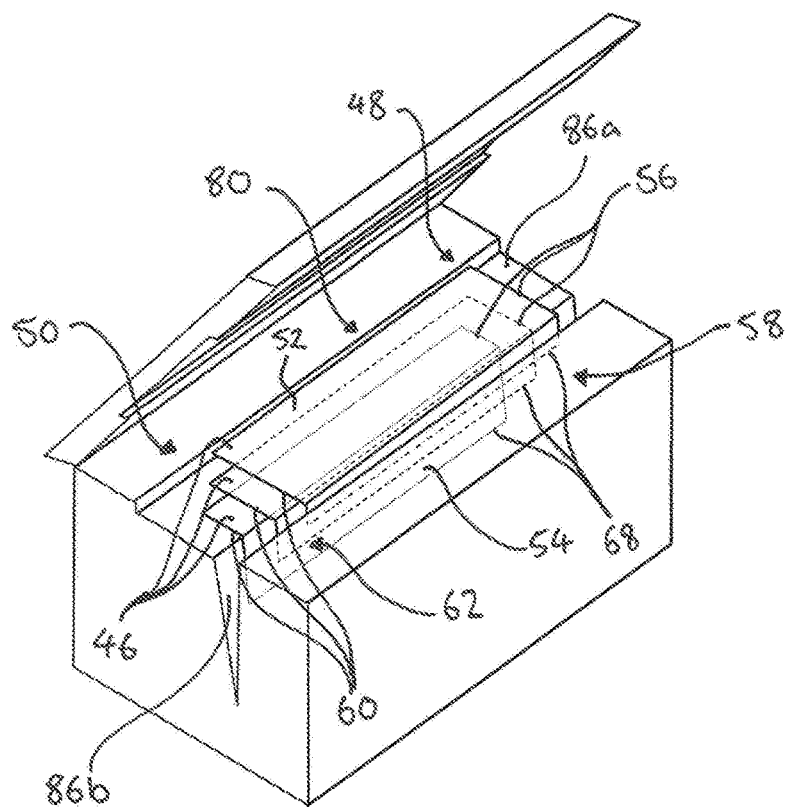

As shown in FIG. 10*b*, a plurality of flange elements 46 are arranged with the mould surface 86 in an array 80 such that the flange elements 46 are positioned one on top of another. The flange elements 46 comprise a fibrous material such as +/−45° biaxial fibre. The flange elements 46 are arranged on the first portion 86*a* of the mould surface 86 to form the base 42 of the flange section 36, and on the second portion 86*b* of the mould surface 86 to form an upstand 44 that extends substantially away from the base 42.

The flange elements 46 are arranged with first and second longitudinal ends 56, 60 of each flange element 46 longitudinally offset from respective first and second longitudinal ends 56, 60 of neighbouring flange elements 46. Tapered portions 58, 62 are thereby formed at first and second longitudinal ends 48, 50 of the flange section 36. Consecutive flange elements 46 in the array 80 are arranged with at least one longitudinal edge 68 offset from a corresponding longitudinal edge 68 of a neighbouring flange element 46 to form a tapered upstand 44 and/or a tapered base 42 of the flange section 36.

The flange elements 46 may be pre-formed with a substantially L-shaped cross-section prior to arranging said elements 46 with the mould surface 86. Each of the flange elements 46 therefore comprises a base 52 and an upstand 54 extending substantially away from the base 52. When arranging pre-formed flange elements 46 with the mould surface 86 in the RTM process, the base 52 of each flange element 46 is arranged on the first portion 86*a* of the mould surface 86 to form the base 42 of the flange section 36. Similarly, the upstand 54 of each flange element 46 is arranged on the second portion 86*b* of the mould surface 86 so as to form the upstand 44 of the flange section 36.

The flange elements 46 may be pre-formed by arranging flange elements 46 on a mould surface 78 in a manner as described above with reference to FIGS. 9*a* to 9*c*. The flange elements 46 may comprise a binding agent such as an epoxy binder or such a binder may alternatively be applied to the flange elements 46 once arranged in the array 80. Pre-forming the flange elements 46 as a semi-rigid component prior to arranging them on the mould surface 86 in the RTM process reduces lay-up time in the RTM mould 84 and can increase the accuracy and repeatability of forming each flange section 36. The preformed flange elements 46 can be produced off-line in parallel with the resin transfer moulding operation and can be produced in an automated process to further increase accuracy in forming uniform tapered portions 58, 62 of each flange section 36. The pre-formed flange elements 46 may comprise dry fibrous material or may alternatively comprise pre-preg fibrous material.

Figure 10C:
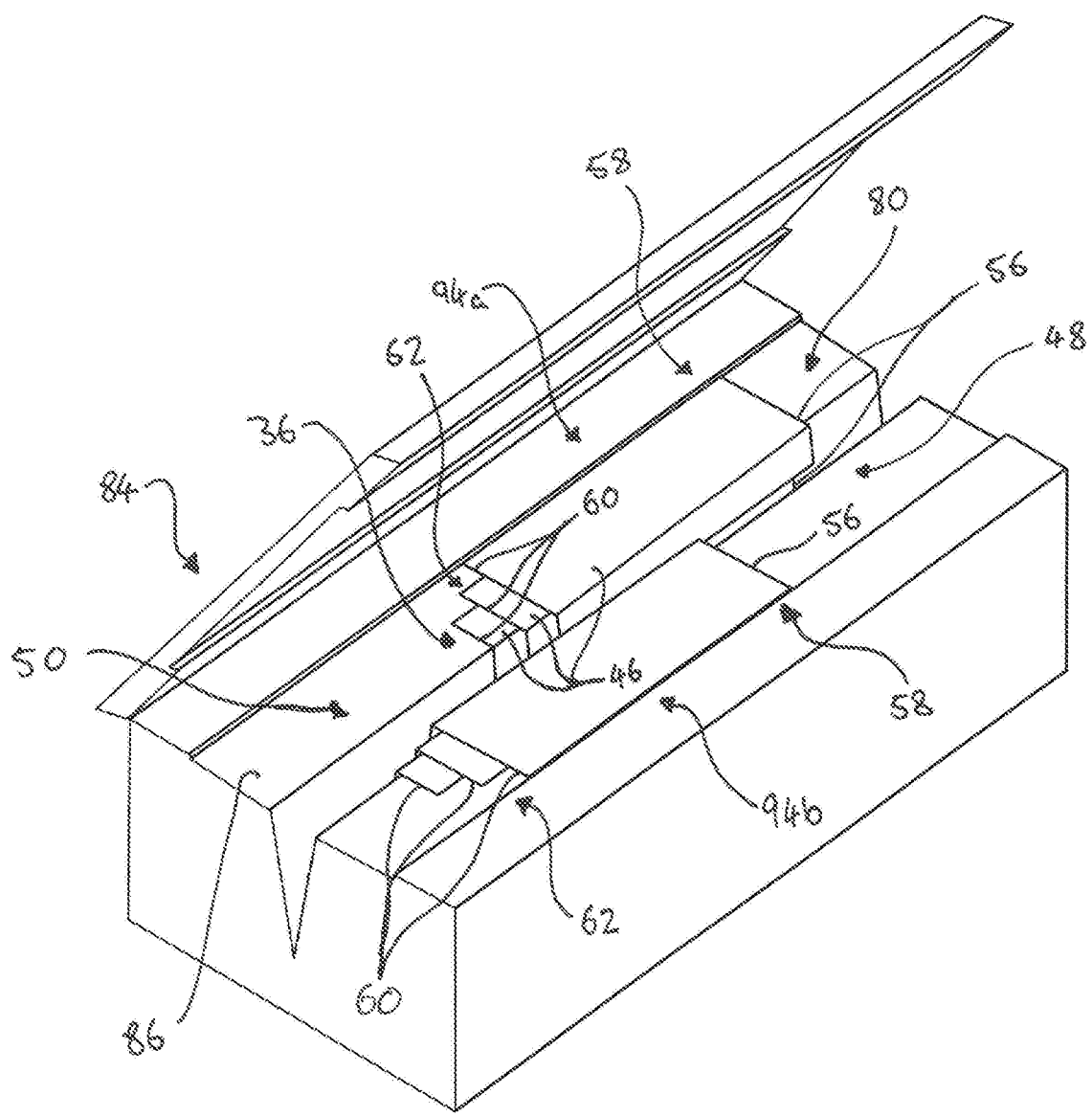

The mould cavity 88 may comprise a substantially T-shaped profile in cross-section as shown schematically in FIG. 10*c*. Such a mould assembly 84 may be used to form a substantially T-shaped flange section 36 by an RTM process. As illustrated in FIG. 10*c*, four or more flange elements 46 are arranged in the array 80 on the mould surface 86 to form a substantially T-shaped flange section 36 according to the present example in an RTM process. At least two flange elements 46 are arranged to form a first side 94a of the flange section 36 and at least two flange elements 46 are arranged to form a second side 94b of the flange section 36. Although six flange elements 46 are shown, any number of a plurality of flange elements 46 may be arranged to form each of the first and second sides 94a, 94b of the flange section 36 and the invention is not limited to a flange section 36 comprising only three flange elements 46 forming the first and second sides 94a, 94b. The flange elements 46 forming each of the first and second sides 94a, 94b of the flange section 36 are arranged on the mould surface 86 in a manner consistent with the arrangement of flange elements 46 to form flange sections 36 described above, i.e. with first and second longitudinal ends 56, 60 of each flange element 46 longitudinally offset from respective first and second longitudinal ends 56, 60 of a neighbouring flange element 46.

As in other examples, the longitudinal offset between each of the flange elements 46 on each side 94a, 94b of the T-shaped flange section 36 results in the formation of a tapered portion 58, 62 at the first and second ends 48, 50 of the flange section 36 on each of the first and second sides 94a, 94b of the flange section 36 respectively. The flange elements 46 arranged to form the second side 94b of the flange section 36 are arranged such that first longitudinal ends 56 of said flange elements 46 are longitudinally offset from corresponding first longitudinal ends 56 of the flange elements 46 arranged to form the first side 94a of the flange section 36. The tapered portions 58 formed at the first end 56 on each of the first and second sides 94a, 94b of the flange section 36 are therefore similarly offset in the longitudinal direction.

Figure 10D:
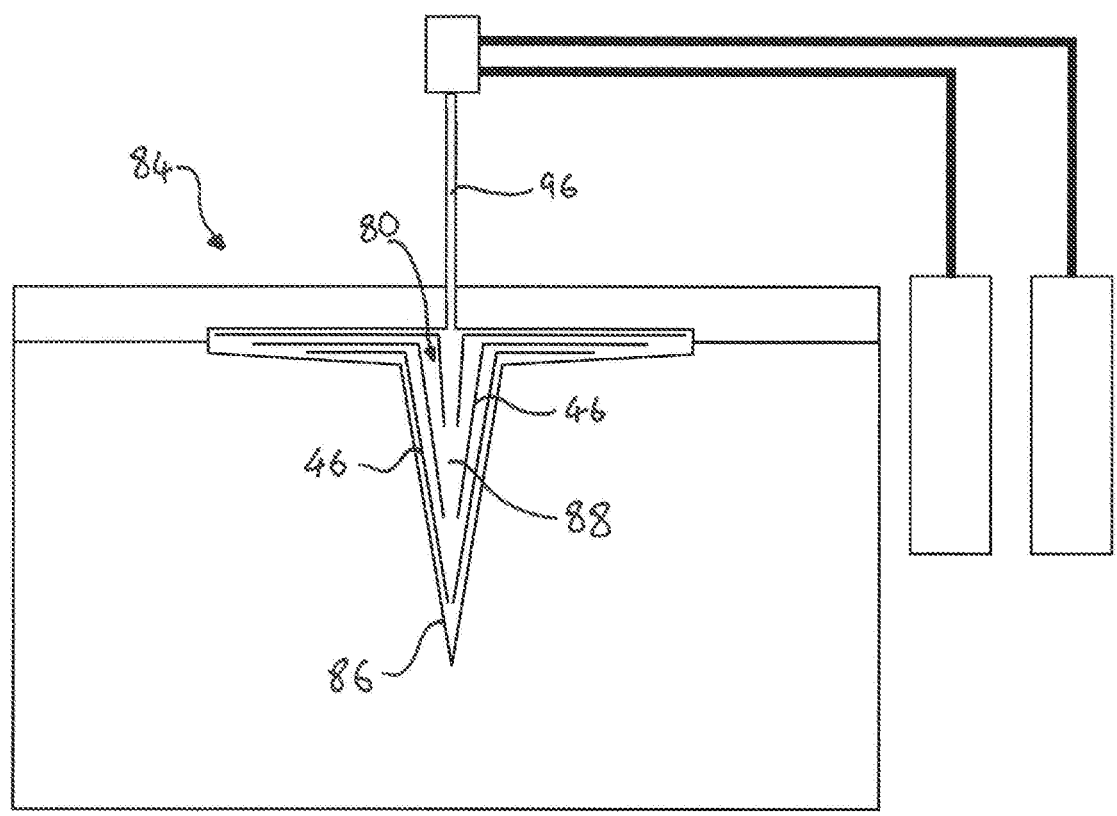

Referring to FIG. 10d, following the arranging of flange elements 46 with the mould surface 86 of the mould assembly 84, resin 96 is injected to the mould cavity 88. In some examples, the mould cavity 88 may be evacuated to create a vacuum pressure therein prior to the injection of resin 96 to the cavity 88. The resin 96 is cured in the mould cavity 88, thereby curing the array 80 of flange elements 46 in a resin matrix to form a cured flange section 36 having a laminate construction.

Each of the surfaces of a flange section 36 formed in an RTM process is a moulded surface which may be used as datum surface when assembling the flange sections 36 with other components of the blade 10. The RTM process can produce consistently uniform flange sections 36 at a high throughput rate resulting in a more cost effective manufacturing process. Further to this, a high volume fraction is achievable in the RTM process, wherein a higher ratio of reinforcing fibrous material to resin is possible than in many other moulding processes, resulting in increased structural properties of the flange section 36.

Figure 11A:
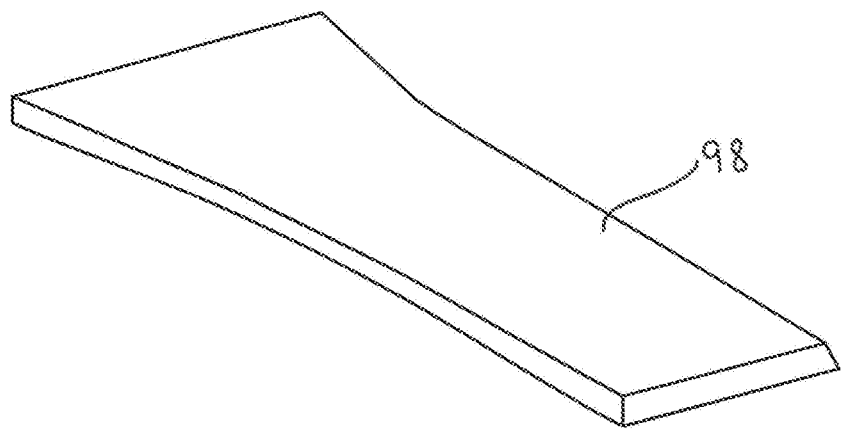
FIGS. 11a to 11g schematically show stages involved in manufacturing a shear web of a wind turbine blade.
Figure 11B:
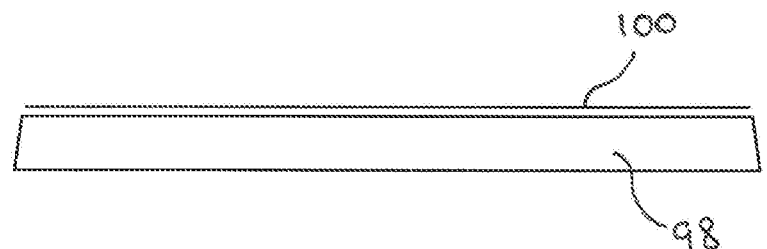

FIGS. 11a to 11g depict some of the stages involved in the manufacture of a wind turbine blade shear web 26 according to various examples. FIG. 11a shows a schematic perspective view of shear web mould surface 98. In some examples, plies of fibrous material 100 are arranged on the mould surface 98 to form an outer skin of the shear web 26 as shown in FIG. 11b. An elongate panel 28 is arranged either on the mould surface 98 or on top of the shear web plies 100.

Figure 11C:
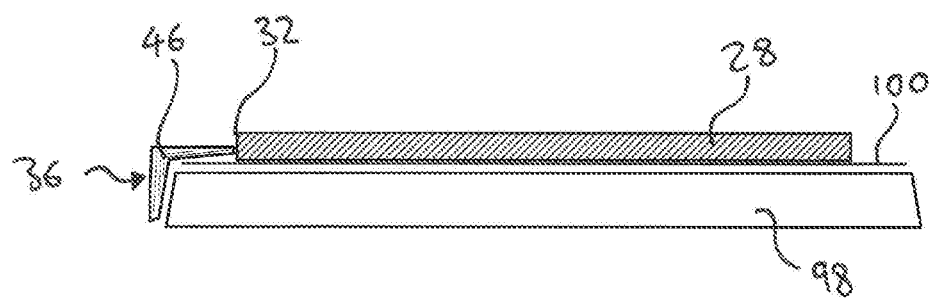
Figure 11D:
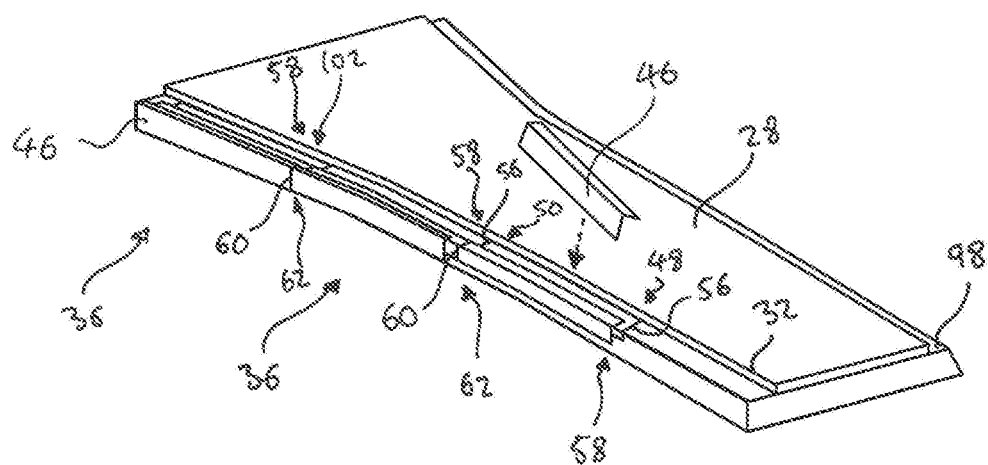

A plurality of flange sections 36 according to any of the examples described above are then arranged along a longitudinal edge 32 of the elongate panel 28 as shown in FIG. 11c. The flange sections 36 may be pre-manufactured components of a laminate construction with a plurality of flange elements 46 disposed in a cured resin matrix as described above with reference to FIGS. 4 and 9a to 10d. Alternatively, the flange sections 36 may be formed in-situ when arranging components to form the shear web 26 as shown in FIG. 11d.

Where the flange sections 36 are formed in-situ, i.e. at the same time that the complete shear web 26 is formed, a plurality of flange elements 46 are provided in an uncured state. As in other examples, the flange elements 46 comprise fibrous material such as +/−45° biaxial fabric. The flange elements 46 are arranged along a longitudinal edge 32 of the elongate panel 28 on the shear web mould surface 98. Flange sections 36 are formed by arranging flange elements 46 one on top of another in an arrangement as described in earlier examples. As shown in FIG. 11d, tapered portions 58, 62 are formed at first and second longitudinal ends 48, 50 of each flange section 36 by arranging the flange elements 46 such that first and second ends 56, 60 of each flange element 46 are longitudinally offset from corresponding first and second ends 56, 60 of neighbouring flange elements 46.

The flange sections 36 are arranged such that the tapered portions 58, 62 at the first and second longitudinal ends 48, 50 thereof overlap with the tapered portions 62, 58 of respective second and first ends 50, 48 of longitudinally adjacent flange sections 36. By arranging the flange sections 36 with the tapered portions 58, 62 of longitudinally adjacent flange sections 36 overlapping, at least one scarf joint 102 is formed between the adjacent flange sections 36 forming the wind turbine blade shear web flange 30.

Figure 11E:
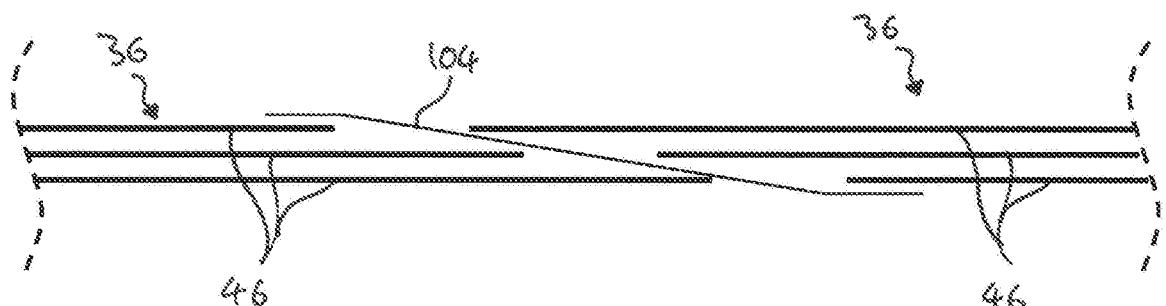

As shown in FIG. 11e, a layer of permeable material 104 is arranged between adjacent flange sections 36 when arranging the plurality of flange sections 36 with the elongate panel 28. The permeable material 104 promotes a more complete resin infusion between the various components of the shear web 26 and serves to reduce defects or irregularities in the manufacture of the shear web 26. Especially when manufacturing a shear web 26 using cured flange sections 36 of any of the above examples, the layer of permeable material 104 allows resin to infuse thoroughly between adjacent surfaces of adjacent cured flange sections.

Figure 11F:
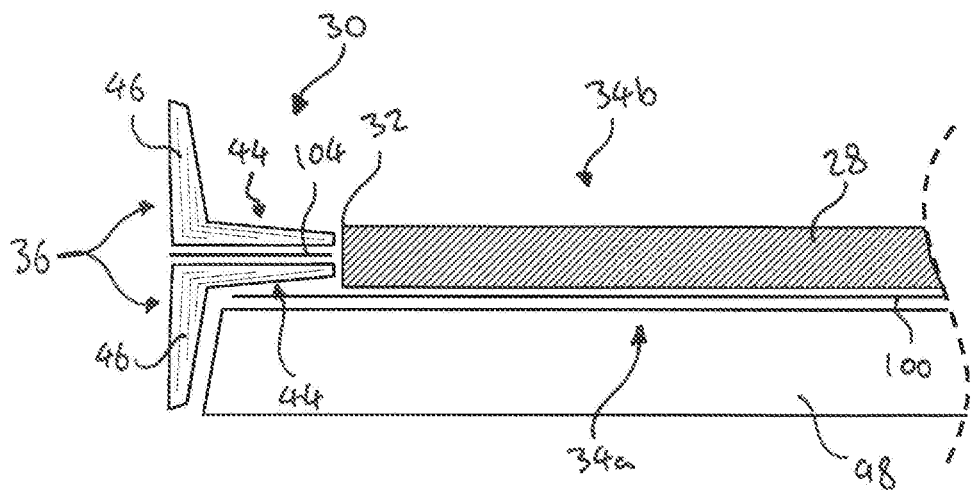

To form a substantially T-shaped shear web flange 30, arranging the plurality of flange sections 36 along a longitudinal edge 32 of the elongate panel 28 may comprise arranging a plurality of flange elements 46 having a substantially L-shaped cross section along both of the first and second sides 34a, 34b of the elongate panel 28 as shown in FIG. 11f. This stage is equally applicable for manufacturing a shear web comprising cured or uncured flange sections 36 having a substantially L-shaped cross-section. A plurality of the flange elements 46 are arranged back to back, i.e. with upstands 44 facing one another to form flange sections 36 having a substantially T-shaped cross section. In an example where the flange sections 36 are cured laminate components, the plurality of flange elements 46 arranged along the first and second sides 34a, 34b of the panel 28 are comprised in the cured flange sections 36. As previously mentioned, a layer of permeable material 104 is preferably arranged between adjacent flange sections 36.

Alternatively, a cured flange section 36 comprising a substantially T-shaped cross section as described in other examples above may be arranged along a longitudinal edge 32 of the elongate panel 28 to form a shear web flange 30 with a substantially T-shaped cross-section.

Figure 11G:
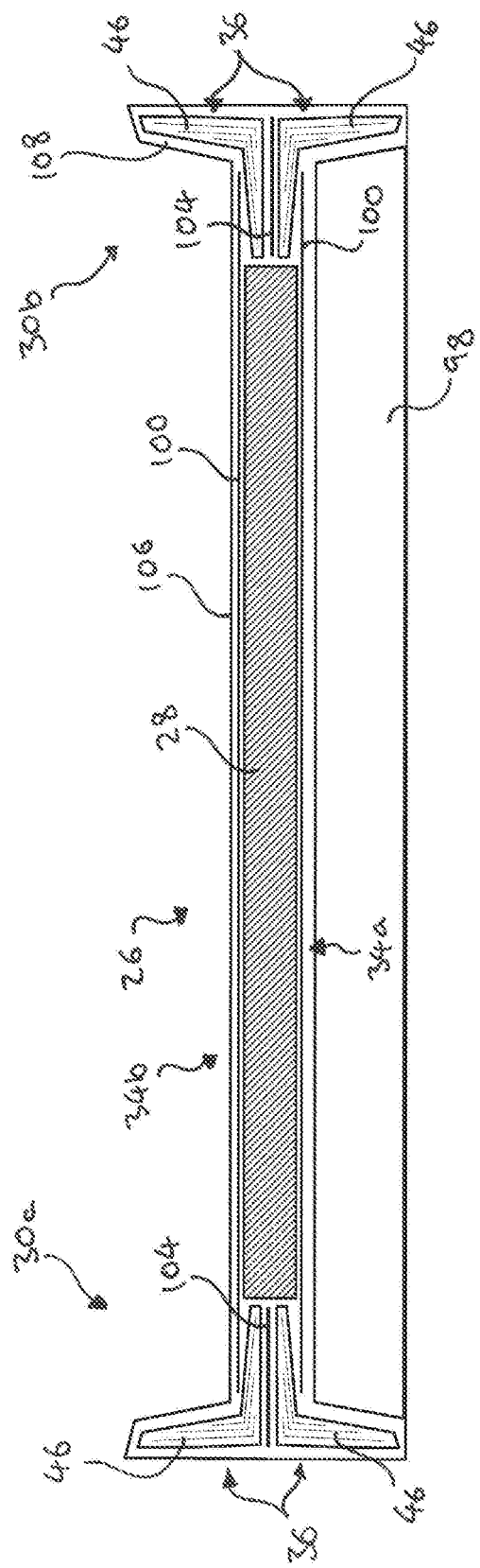

Further plies of fibrous material 100 may be arranged with the flange sections 36 and elongate panel 28 in some examples as shown in FIG. 11g. In this example, the shear web 26 comprises a sandwich panel structure whereby the core material of the elongate panel 28 is sandwiched between plies of fibrous material 100 on both the first and second sides 34a, 34b of the shear web 26. A plastic vacuum bag 106 is arranged over the mould surface 98 and the components arranged thereon to form a sealed region 108 between said vacuum bag 106 and the mould surface 98 encapsulating the shear web components. Resin is admitted to the sealed region 108 to integrate the plurality of flange sections 36 and elongate panel 28, the resin then being cured to form the wind turbine blade shear web 26. The plurality of laminate flange sections 36 and elongate panel 28 are thereby integrated within a resin matrix to form the wind turbine blade shear web 26. In a preferred example, the sealed region 108 may be evacuated to form a vacuum cavity prior to the resin infusion according to a known vacuum assisted resin transfer moulding (VARTM) process.

Although the invention has been described throughout with reference to a shear web 26 of a wind turbine blade 10, it should also be appreciated that the arrangement of flange sections 36 and methods for manufacturing described above may be equally applicable to other structural webs in a wind turbine blade 10. For example, a trailing edge web, used in addition to a shear web 26 to provide structural support to the trailing edge 24, may be similarly constructed from flange sections 36 comprising the features as described above and following a method described above with reference to a shear web 26.

The invention claimed is:

1. A shear web for a wind turbine blade, the shear web comprising:
   an elongate panel including a first side and an opposing second side; and
   a longitudinally extending flange arranged along a longitudinal edge of the panel, the flange comprising a first plurality of elongate flange sections integrated along the first side of the panel, and a second plurality of elongate flange sections integrated along the second side of the panel,
   wherein each flange section includes a plurality of elongate flange elements stacked on top of one another with a longitudinal offset such that a first tapered portion and a second tapered portion are respectively formed at a first longitudinal end and a second longitudinal end of each flange section,
   wherein the first tapered portion of each flange section is configured to overlap with the second tapered portion of an adjacent flange section so as to define at least one scarf joint,
   wherein each flange section further includes an L-shaped cross-section comprising a base and an upstand extending away from the base,
   wherein the upstands of the first plurality of flange sections face the upstands of the second plurality of flange sections so as to define a T-shaped cross-section of the flange, and
   wherein the first longitudinal ends and the second longitudinal ends of the first plurality of flange sections are longitudinally offset from the first longitudinal ends and the second longitudinal ends of the second plurality of flange sections.

2. The shear web of claim 1, wherein each flange element includes an L-shaped cross-section comprising an element base and an element upstand extending away from the element base.

3. The shear web of claim 1, wherein in each flange section, one of an upward or downward facing scarfed surface is defined on the base at the first and second tapered portions so as to define the at least one scarf joint.

4. The shear web of claim 1, wherein in each flange section, the upstand defines first and second scarfed surfaces respectively formed at the first and second tapered portions so as to define the at least one scarf joint.

5. The shear web of claim 1, wherein each flange element is made of a fibrous material comprising fibers formed into a +/−45 degree biaxial fabric in which less than 30% of the fibers are oriented in a longitudinal direction of the flange element.

6. The shear web of claim 1, wherein each flange section is of laminate construction in which the plurality of flange elements is disposed in a cured resin matrix.

7. A wind turbine blade comprising the shear web of claim 1.

8. A method of manufacturing a shear web of a wind turbine, the method comprising;
   arranging an elongate panel;
   arranging a plurality of flange sections along a longitudinal edge of an elongate panel, each flange section including a plurality of elongate flange elements stacked on top of one another with a longitudinal offset such that a first tapered portion and a second tapered portion are respectively formed at a first longitudinal end and a second longitudinal end of each flange section,
   overlapping the first tapered portion of each flange section with the second tapered portion of an adjacent flange section so as to define at least one scarf joint; and
   integrating the plurality of flange sections and the elongate panel so as to form the shear web,
   wherein the arranging of the plurality of flange sections comprises arranging a first plurality of flange sections on a first side of the elongate panel, and arranging a second plurality of flange sections on a second side of the elongate panel so as to form a flange with a T-shaped cross section, and
   wherein the first longitudinal ends and the second longitudinal ends of the first plurality of flange sections are longitudinally offset from the first longitudinal ends and the second longitudinal ends of the second plurality of flange sections.

9. The method of claim 8, wherein each flange section includes an L-shaped cross-section, and
   wherein the arranging of the plurality of flange sections further comprises arranging the first plurality of flange sections against the second plurality of flange sections so as to define the T-shaped cross section.

10. The method of claim 8, wherein a layer of permeable material is arranged between adjacent flange sections of the first plurality of flange sections and between adjacent flange sections of the second plurality of flange sections.

* * * * *